(12) United States Patent
Rainer

(10) Patent No.: US 10,224,803 B1
(45) Date of Patent: Mar. 5, 2019

(54) SWITCHED CAPACITOR CONVERTER WITH COMPENSATION INDUCTOR

(71) Applicant: Infineon Technologies Austria AG, Villach (AT)

(72) Inventor: Christian Rainer, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/848,782

(22) Filed: Dec. 20, 2017

(51) Int. Cl.
| H02M 1/08 | (2006.01) |
| H02M 3/158 | (2006.01) |
| H02M 3/07 | (2006.01) |
| H02M 1/15 | (2006.01) |
| H02M 3/335 | (2006.01) |
| H02M 1/00 | (2006.01) |

(52) U.S. Cl.
CPC ............. *H02M 1/083* (2013.01); *H02M 1/15* (2013.01); *H02M 3/07* (2013.01); *H02M 3/1588* (2013.01); *H02M 3/335* (2013.01); H02M 2001/007 (2013.01); H02M 2001/0058 (2013.01)

(58) Field of Classification Search
CPC ...... H02M 1/083; H02M 1/15; H02M 3/1588; H02M 3/07; H02M 3/335; H02M 2001/0058; H02M 2001/007
See application file for complete search history.

(56) References Cited

U.S. PATENT DOCUMENTS

| 4,178,612 A | 12/1979 | Dudley et al. |
| 4,316,101 A | 2/1982 | Minner et al. |
| 5,101,334 A | 3/1992 | Plagge et al. |
| 7,821,305 B1 | 10/2010 | Limotyrakis |
| 8,503,203 B1 | 8/2013 | Szczeszynski et al. |
| 8,817,501 B1 | 8/2014 | Summit et al. |

(Continued)

OTHER PUBLICATIONS

Du, Sixing et al., "A Startup Method for Flying-Capacitor Modular Multilevel Converter (FC-MMC) With Effective Damping of LC Oscillations", IEEE Transactions on Power Electronics, vol. 32, No. 7, Jul. 2017, pp. 5827-5834.
Li, Yanchao et al., "Multilevel Modular Switched-Capacitor Resonant Converter with Voltage Regulation", IEEE Applied Power Electronics Conference and Exposition (APEC), Mar. 2017, pp. 88-93.
Sepahvand, Hossein et al., "Start-up Procedure and Switching Loss Reduction for a Single-Phase Flying Capacitor Active Rectifier", IEEE Transactions on Industrial Electronics, vol. 60, No. 9, Sep. 2013, pp. 3699-3710.

(Continued)

*Primary Examiner* — Emily P Pham
(74) *Attorney, Agent, or Firm* — Murphy, Bilak & Homiller, PLLC

(57) ABSTRACT

Circuits and methods are provided for soft switching within a switched-capacitor DC/DC converter, so as to reduce switching losses and improve efficiency. This is accomplished, in preferred converters, by coupling a compensation inductor between one half-bridge of an output rectifier and another half-bridge of the output rectifier. The compensation inductor functions to transfer charge from or to the capacitance of switches within the converter while the switches are off, such that the voltage across each switch is reduced to zero before that switch is turned on. This provides zero-voltage switching (ZVS) and its associated high efficiency. The efficiency associated with the ZVS makes ideal zero-current switching (ZCS) less important, such that high-precision capacitors and inductors forming the resonant tanks required by near-ideal ZCS are not required. The resultant circuits are physically smaller and less expensive than other converters that require near-ideal ZCS, but achieve similar or better efficiency.

20 Claims, 9 Drawing Sheets

(56) References Cited

U.S. PATENT DOCUMENTS

| | | |
|---|---|---|
| 9,054,576 B2 | 6/2015 | Kang et al. |
| 9,831,776 B1 | 11/2017 | Jiang et al. |
| 9,917,517 B1 * | 3/2018 | Jiang ................ H02M 1/14 |
| 2007/0200538 A1 | 8/2007 | Tang et al. |
| 2010/0117719 A1 | 5/2010 | Matano |
| 2012/0223583 A1 | 9/2012 | Cooley et al. |
| 2014/0002038 A1 | 1/2014 | Hsu et al. |
| 2014/0285167 A1 | 9/2014 | Audy et al. |
| 2015/0016163 A1 | 1/2015 | Krainer et al. |
| 2015/0097546 A1 | 4/2015 | Pan et al. |
| 2015/0102793 A1 | 4/2015 | Wang et al. |
| 2015/0365013 A1 | 12/2015 | Hameed et al. |
| 2016/0028304 A1 | 1/2016 | O'Day |
| 2016/0141951 A1 | 5/2016 | Luo et al. |
| 2017/0106820 A1 | 4/2017 | Nakamura et al. |

OTHER PUBLICATIONS

Cao, Dong, et al., "Multilevel Modular Converter with Reduced Device Count for Hybrid and Electric Vehicle", 2015 IEEE Transportation Electrification Conference and Expo (ITEC), Jun. 2015.

Cao, Dong, et al., "Optimal Design of Multilevel Modular Switched-Capacitor DC-DC Converter", 2011 IEEE Energy Conversion Congress and Exposition, Sep. 2011, pp. 537-544.

Cao, Dong, et al., "Zero Voltage Switching Double-Wing Multilevel Modular Switched-Capacitor DC-DC Converter with Voltage Regulation", 2013 Twenty-Eighth Annual IEEE Applied Power Electronics Conference and Exposition (APEC), Mar. 2013, pp. 2029-2036.

Cao, Dong, et al., "Zero-Current-Switching Multilevel Modular Switched-Capacitor DC-DC Converter", IEEE Transactions on Industry Applications, vol. 46, No. 6, Nov./Dec. 2010, pp. 2536-2544.

* cited by examiner

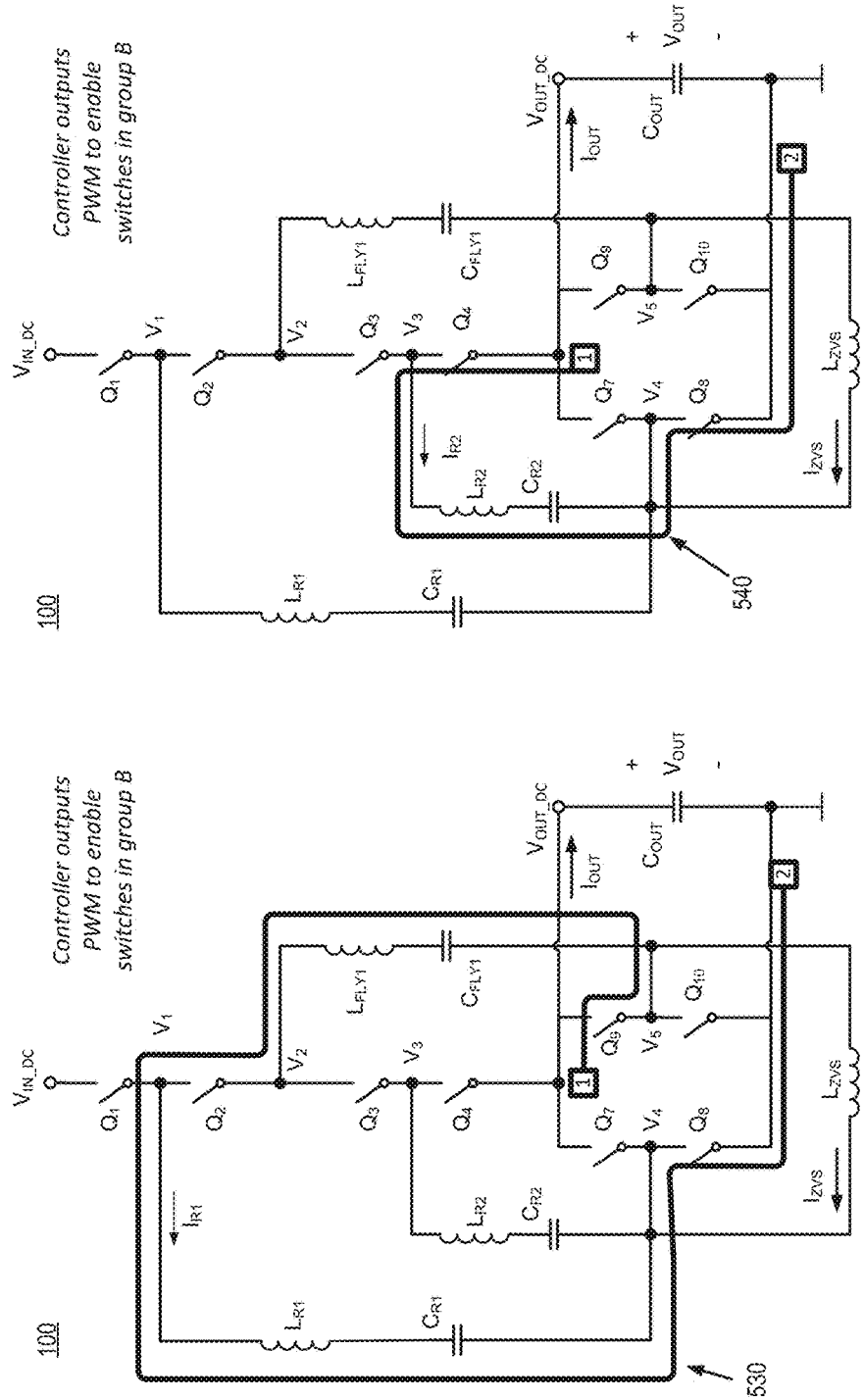

SWITCHED CAPACITOR CONVERTER WITH COMPENSATION INDUCTOR

TECHNICAL FIELD

The present application relates to switched-capacitor converters and, in particular, relates to circuit topologies in which a compensation inductor is used to transfer charge to or from switches within the switched-capacitor converter, so as to achieve zero voltage switching.

BACKGROUND

Switching direct current (DC) to DC converters are used in a variety of applications for converting power at an input voltage into power at a desired output voltage. One application in which DC-to-DC converters are commonly used is to provide power in data centers. There are a large number of data centers worldwide and their number continues to grow. The resultant energy consumption of such data centers is becoming a significant (and growing) portion of the overall worldwide energy consumption. Hence, there is a significant motivation to improve the efficiency of power converters used in data centers.

Data centers and other electronic systems have, for many years, relied upon a 12V intermediate DC bus for supplying power to a variety of circuits. Such a 12V DC bus may be widely distributed within a system and typically is down-converted to a lower voltage, e.g., 3.3V, 1.8V, 1.2V, for use by loads requiring lower voltage levels. Such down-conversion is preferably performed at the point-of-load (POL), so that the voltage level required by the load may be more efficiently regulated.

Modern power distribution systems for data centers and related are moving to an intermediate DC bus having a voltage of 40V to 60V. By using a higher intermediate DC voltage such as this, the power loss incurred in distributing the intermediate DC voltage is reduced. The intermediate DC voltage may be provided by an unregulated first conversion stage that is highly efficient. A second conversion stage is preferably located near the POL, and requires a larger step-down ratio than the case wherein the intermediate voltage is only 12V.

A common implementation of a second conversion stage, when using an intermediate DC voltage in the 40V to 60V range, uses a switched-capacitor converter based upon a Dickson charge pump topology. Such a switched-capacitor converter uses switches to transfer charge among capacitors, thereby reducing a provided intermediate input voltage, e.g., from an input of 48V to an output of 12V for a 4:1 switched-capacitor converter. Without appropriate consideration for the switch timing in such converters, losses are incurred due to hard switching, i.e., switching the switches when there is non-zero voltage across them and non-zero current flowing through them.

The above-described hard switching may be mitigated by placing an inductor in series with the capacitor at each stage of the switched-capacitor converter, thereby borrowing a design technique used in resonant (or semi-resonant) switching converters such as those based upon a center-tapped inductor. The resultant switched-capacitor converter is sometimes termed a switched tank converter (STC). The resonant tank formed by the series connection of the inductor and capacitor has an associated resonant frequency that is based upon the inductance and capacitance of these components. If the switches are switched at this resonant frequency, zero current switching (ZCS) may be achieved leading to reduced switching losses and good efficiency in the power conversion.

Matching the switching frequency of the STC to the resonant frequency of one or more resonant tanks within the STC presents practical challenges beyond the challenges associated with conventional resonant switching converters that are not based on a switched-capacitor topology. Such conventional resonant converters may characterize the reactance of the resonant tank, e.g., during a calibration stage, and set the switching frequency accordingly. Alternately or additionally, a controller of such a conventional resonant converter may measure voltage and/or current through the switches and dynamically adjust the switching frequency to match the natural resonant frequency of a resonant tank. Such techniques are generally not feasible in an STC. To achieve down-conversion rates greater than 2:1, multiple switch stages are required within the STC, each of which has its own resonant tank. Because the controller must switch the switches in each switch stage using the same frequency, it is not feasible, at least without significant control complexity, to adjust the switching frequency to match individual resonant tanks when there are multiple switch stages. Furthermore, techniques that rely upon measurement of current and/or voltage add undesirable circuit complexity and often introduce additional inefficiencies to the converter.

An STC having multiple switch stages, hence, uses multiple resonant tanks that need to have nearly identical resonant frequencies. This, in turn, requires that the inductance-capacitance product of each resonant tank be the same. Standard inductors and capacitors have fairly large tolerances, e.g., ±10%, ±20%. Furthermore, the inductance and capacitance of standard inductors and capacitors depend heavily on temperature. Therefore, use of standard inductors and capacitors typically leads to significantly different resonant frequencies across the switch stages of an STC, and these resonant frequencies may have a high variation over temperature. A controller switching all of the switches at the same frequency will typically not be able to achieve zero current switching in all of the switch stages when using standard components. This, in turn, leads to inefficiency in the power conversion of the STC. To overcome this problem, STCs may use high-precision capacitors and inductors that have a small temperature dependence. However, such components are more expensive and physically larger than standard inductors and capacitors.

Circuits and associated techniques are desired that would allow for a reduction in the size and cost of inductors and capacitors used in STCs, while achieving efficiencies associated with soft switching.

SUMMARY

According to an embodiment of a switched-capacitor converter (SCC), the SCC converts power provided at an input direct-current (DC) voltage from an input power supply into power provided to an output load at an output DC voltage. The SCC includes a rectifier, a first switch stage, a first resonant leg, a controller, and a compensation inductor. The first switch stage comprises first and second switches which are connected in series at a first interconnection node, and is interposed between the input and the rectifier. The first resonant leg includes a first resonant capacitor which couples the first connection node to a first half-bridge branch of the rectifier. The controller is operable to provide switch control signals that alternate switching of the first and second switches in the first switch stage, as well as switches within the rectifier. This switching is performed at a switch frequency that is chosen to approximate zero current switching (ZCS) conditions for each of the switches. A first compensation inductor couples the first half-bridge rectifier branch to a second half-bridge rectifier branch or to a ground. The first compensation inductor serves to transfer charge to or from capacitances of the switches so as to reduce the voltage across each switch to zero before such switch is turned on, thereby implementing zero-voltage switching (ZVS) and reducing switching losses.

According to an embodiment of a method, the method provides a switched-capacitor converter (SCC) that converts power at an input into power at an output. The method comprises providing a rectifier, a first switch stage, and a first resonant leg. The first switch stage is coupled to the input and includes first and second switches which are connected in series at a first connection node. The rectifier is interposed between the first switch stage and the output such that the rectifier provides a rectified voltage at the output. The first resonant leg includes a resonant capacitor coupled between the first connection node and a first half-bridge branch of the rectifier. The method further includes characterizing a first resonant inductance within a first power loop connecting the input to the output, wherein the first power loop includes the first switch, the first resonant leg, one switch of the first half-bridge rectifier branch, and the traces connecting these elements. A switching frequency for the SCC is determined and a first capacitance for the first resonant capacitor is determined based upon the chosen switching frequency and the characterized first resonant inductance. Finally, a compensation inductor is provided which couples the first half-bridge rectifier branch to either a second half-bridge rectifier branch or to a ground. The compensation inductor provides a conduction path for transferring charge to or from switch capacitances such that the voltage across each switch may be reduced to zero before that switch is turned on, thereby enabling zero-voltage switching (ZVS).

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

FIGS. 5A, 5B, 5C, and 5D illustrate four power loops within the SCC of FIG. 1.

DETAILED DESCRIPTION

Figure 1:
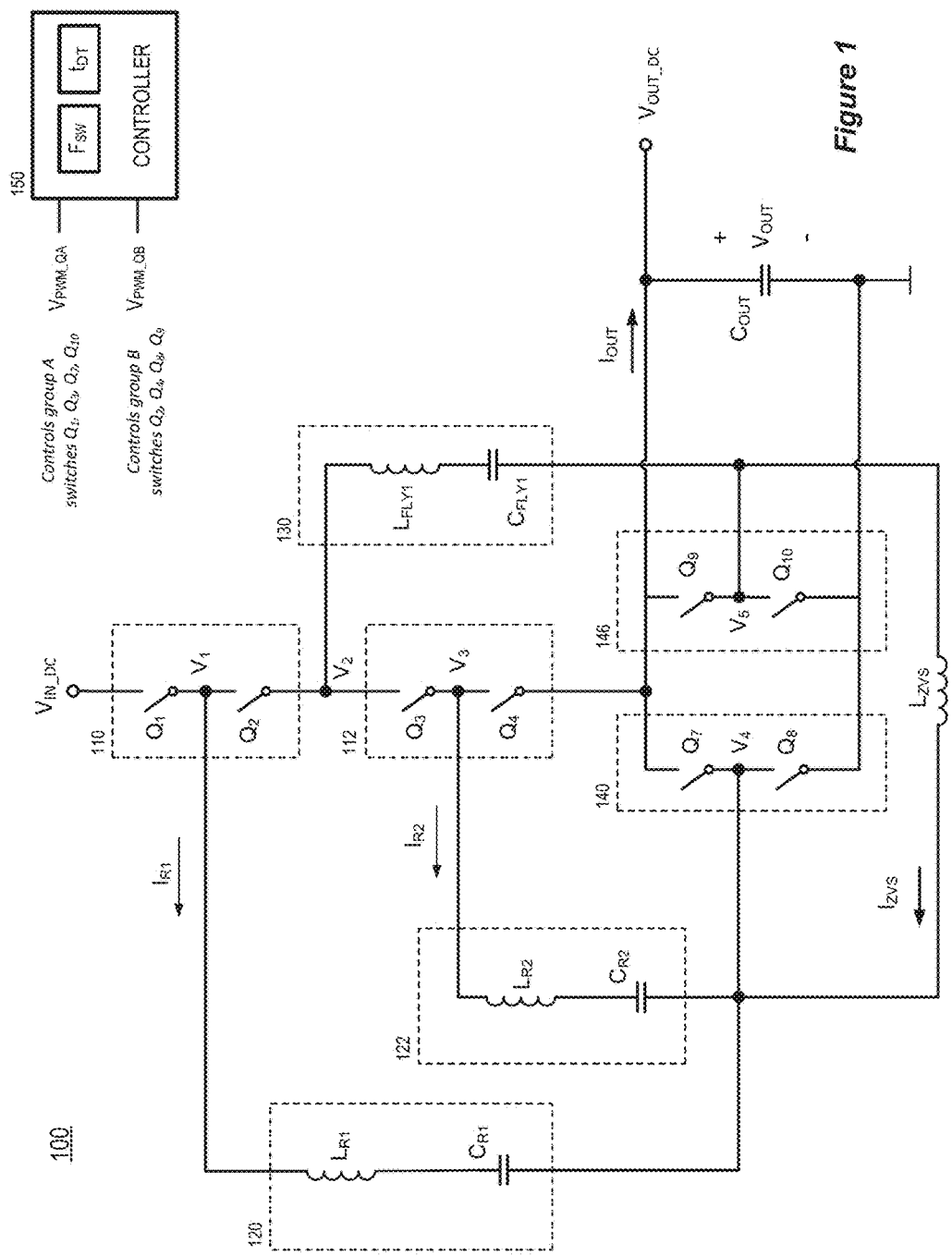
FIG. 1 illustrates a schematic diagram of a switched-capacitor converter (SCC) having a compensation inductor the couples a first half-bridge to a second half-bridge of a rectifier.

The embodiments described herein provide circuits and methods that enable efficient operation of a switched-capacitor converter (SCC) while not requiring high-precision inductors and capacitors. This is achieved by introducing a compensation inductor that is not part of a resonant tank within the SCC, but which serves to transfer charge to or from switch capacitances when the switches are off, i.e., during dead-time intervals that occur between intervals when adjacent switches are conducting. By transferring charge (energy) to or from the compensation inductor when the switches are off, the voltage across a switch may be reduced to zero just before the switch is enabled, thereby providing zero-voltage soft switching (ZVS) and the efficiencies associated with such ZVS.

In preferred embodiments, no inductor components are required in the resonant tanks of the SCC. Instead, the parasitic inductance of the traces and components (e.g., switches, capacitors) within a given power loop is used as a resonant inductance. Once the resonant inductance for a given power loop is characterized, a resonant capacitance may be determined to provide resonance at a given switching frequency. This, in turn, should provide nearly zero current switching (ZCS). Inaccuracy in the characterized resonant inductance or the resonant capacitance, as caused by component variation or temperature drift, may lead to a mismatch between the switching frequency and the resonant frequency for a given resonant leg of the SCC. Such a frequency mismatch causes loss of ZCS. While ideal ZCS and its associated efficiency may not be achieved due to such mismatch, the efficiency associated with the ZVS allows the SCC to still have good efficiency. Stated alternately, the soft-switching enabled by the compensation inductor makes efficient operation of SCC more tolerant to variation in the resonant inductance and capacitance, and the resonant frequency determined from these reactances.

Note that resonant inductor components may be used within an SCC that also makes use of the compensation inductor, and such an SCC will achieve near ideal ZCS and ZVS. However, use of the compensation inductor and its associated ZVS provides the advantage that resonant inductor components may be eliminated, thereby reducing required space on a printed circuit board, reducing cost, and reducing inductor core loss. (Some of these advantages are partially offset by the need for larger resonant capacitors, but there is a net benefit in eliminating the resonant inductor components.) The use of a compensation inductor and no resonant inductor components also allows an SCC to use a higher switching frequency than SCCs that use resonant inductor components, which provides advantages including lower voltage ripple at the output of the SCC.

The inventions are described below by way of particular examples. This description begins with an embodiment of an SCC that reduces an input voltage by a factor of four, i.e., a 4:1 SCC, and that includes a compensation inductor that provides ZVS (soft-switching). The compensation inductor is placed across two half-bridge branches of a rectifier. While the illustrated examples focus on a 4:1 SCC, it should be understood that the described techniques may be readily extrapolated to other SCC circuits including those that reduce an input voltage by 2:1, 6:1, 8:1, etc. The 4:1 SCC embodiment begins with a description of the circuitry used for implementing such a converter. This is followed by a description of waveforms for currents and voltages found within such an SCC. Circuit topologies in which compensation inductors are placed elsewhere are then described. Finally, a method for designing an SCC that makes use of a compensation inductor is described.

It should be understood that the examples described below are not meant to be limiting. Circuits and techniques that are well-known in the art are not described in detail, so as to avoid obscuring the unique aspects of the invention. Features and aspects from the example embodiments may be combined or re-arranged, except where the context does not allow this.

Switched-Capacitor Converter with Compensation Inductor Across Rectification Branches FIG. 1 illustrates an embodiment of a switched-capacitor converter (SCC) 100 that reduces the voltage provided at an input power supply $V_{IN\_DC}$ by a factor of four. The reduced voltage is provided at an output $V_{OUT\_DC}$. The reduced voltage $V_{OUT}$ provided at the output $V_{OUT\_DC}$ is typically an intermediate voltage, within a system, that must be stepped down further before being supplied to a load such as, e.g., a memory, a central processing unit (CPU). While not shown for ease of illustration, a switching DC/DC converter or a linear regulator coupled to the output $V_{OUT\_DC}$ may provide this further step-down in voltage, and also provide regulation that is not provided by the SCC 100. In other applications, the reduced voltage $V_{OUT}$ provided by the SCC 100 may be used directly by a load.

The illustrated SCC 100 includes a first switch stage 110 which includes first and second switches $Q_1$, $Q_2$, and a second switch stage 112 which includes third and fourth switches $Q_3$, $Q_4$. A rectifier is interposed between the second switch stage 112 and ground, and provides a rectified voltage $V_{OUT}$ to the output $V_{OUT\_DC}$ and a filter capacitor $C_{OUT}$. The illustrated rectifier includes switches $Q_7$ and $Q_8$, which form a first half-bridge rectifier branch 140, and switches $Q_9$ and $Q_{10}$, which form a second half-bridge rectifier branch 146. The switches $Q_7$, $Q_8$ of the first half-bridge rectifier branch 140 are connected at a half-bridge switching node $V_4$, whereas the switches $Q_9$ and $Q_{10}$ of the second half-bridge rectifier branch 146 are connected at another half-bridge switching node $V_5$.

A compensation inductor, denoted $L_{ZVS}$, couples the first half-bridge rectifier branch 140 to the second half-bridge rectifier branch 146 at their respective switching nodes $V_4$, $V_5$. As will be explained in detail further below, the compensation inductor $L_{ZVS}$ provides a conduction path that serves to transfer charge to or from the capacitances $C_{OSS}$ of the switches within the switch stages 110, 112 such that the voltage across these switches, e.g., the drain-to-source voltage $V_{ds}$ for a field effect transistor (FET), is reduced to zero before a given switch is turned on. In this way, the compensation inductor $L_{ZVS}$ enables zero voltage switching (ZVS) for each of the switches, regardless of whether resonant tanks of the circuit branches are matched to a switching frequency of the SCC 100.

The SCC 100 further includes a first resonant leg 120 that couples the first switch stage 110 to the rectifier, and a second resonant leg 122 that couples the second switch stage 112 to the rectifier. The first resonant leg 120 includes a first resonant capacitor $C_{R1}$ and is characterized as having a first resonant inductance $L_{R1}$. A resonant current $I_{R1}$ flows through the first resonant leg 120. The second resonant leg 122 is similarly configured to include a second resonant capacitor $C_{R2}$ and is characterized as having a second resonant inductance $L_{R2}$. A resonant current $I_{R2}$ flows through the second resonant leg 122. As detailed below, the resonant inductances $L_{R1}$, $L_{R2}$ for the preferred embodiment merely represent the parasitic inductances within power loops of the SCC 100.

The first resonant leg 120 couples a switching node V, connecting the first and second switches $Q_1$, $Q_2$ of the first switch stage 110 to the switching node $V_4$ connecting the switches $Q_7$, $Q_8$ of the first half-bridge rectifier branch 140. The second resonant leg 122 similarly couples a switching node $V_3$ connecting the third and fourth switches $Q_3$, $Q_4$ of the second switch stage 112 to the same switching node $V_4$ connecting the switches $Q_7$, $Q_8$ of the first half-bridge rectifier branch 140. A first flying leg 130 couples an inter-stage connection node $V_2$ to the second half-bridge rectifier branch 146 at the connection node $V_5$ between its switches $Q_9$, $Q_{10}$. The first flying leg 130 includes a first flying capacitor $C_{FLY1}$ and is characterized as having a first flying inductance $L_{FLY1}$, which typically is not an inductor component.

The switches $Q_1, \ldots Q_4, Q_7, \ldots Q_{10}$ illustrated in the SCC 100 of FIG. 1 are power metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The switches $Q_1, \ldots Q_4$, $Q_7, \ldots Q_{10}$ may be integrated on the same semiconductor die, may each be provided on separate dies, or may otherwise be spread across a plurality of semiconductor dies. Each of the switches $Q_1, \ldots Q_4, Q_7, \ldots Q_{10}$ within the SCC 100 has drain and source terminals, as well as a gate terminal (not shown for ease of illustration) that controls conduction between the drain and source. A control signal is provided to each of the gate terminals via a driver, which is also not shown for ease of illustration.

The SCC 100 further includes a controller 150 which generates control signals for the switches $Q_1, \ldots Q_4$, $Q_7, \ldots Q_{10}$ of the SCC 100. The controller 150 alternates between setting the first switch $Q_1$ to conduct, while the second switch $Q_2$ is off, and setting the second switch $Q_2$ to conduct, while the first switch $Q_1$ is off. Switching of the switches $Q_3$, $Q_4$ within the second switch stage 112 is similarly alternated, as is the switching of the switches $Q_7$, $Q_8$, $Q_{10}$, $Q_9$ within the first and second half-bridge rectifier branches 140, 146. The switches are partitioned into a group A, including switches $Q_1$, $Q_3$, $Q_7$, $Q_{10}$ which may all be switched together, and a group B, including switches $Q_2$, $Q_4$, $Q_6$, $Q_9$ which may likewise be switched together. The controller 150 generates a pulse-width-modulated (PWM) control signal $V_{PWM\_QA}$ that controls the switches $Q_1$, $Q_3$, $Q_7$, $Q_{10}$ within group A, and a PWM control signal $V_{PWM\_QB}$ that controls the switches $Q_2$, $Q_4$, $Q_8$, $Q_9$ within group B. The switch control signals $V_{PWM\_QA}$, $V_{PWM\_QB}$ are typically input to driver circuits for each of the switches. For the SCC 100 of FIG. 1, the control signal $V_{PWM\_QA}$ may be provided to 4 separate drivers which output control signals $V_{PWM\_Q1}$, $V_{PWM\_Q3}$, $V_{PWM\_Q7}$, $V_{PWM\_Q10}$ for the group A switches $Q_1$, $Q_3$, $Q_7$, $Q_{10}$. The control signal $V_{PWM\_QB}$ may be provided to 4 separate drivers which output control signals $V_{PWM\_Q2}$, $V_{PWM\_Q4}$, $V_{PWM\_Q8}$, $V_{PWM\_Q9}$ for the group B switches. The control signals output from the drivers are then provided to control terminals (e.g., gates) of the switches. For ease of illustration, the drivers are not shown. In alternative implementations, the controller 150 may generate separate control signals for each of the switches, rather than providing common control signals $V_{PWM\_QA}$, $V_{PWM\_QB}$ for the two switch groups.

Waveforms for the alternating control signals $V_{PWM\_QA}$, $V_{PWM\_QB}$ are symmetric, i.e., have the same positive pulse intervals, such that each control signal has a duty cycle of approximately 50%. There is a dead time between pulses of the control signals $V_{PWM\_QA}$, $V_{PWM\_QB}$, i.e., for each switch cycle of the SCC 100 there will be brief intervals during which none of the switches are conducting. The controller 150 generates the control signals $V_{PWM\_QA}$, $V_{PWM\_QB}$ at a switching frequency $F_{SW}$. For optimal efficiency, the resonant frequencies corresponding to the resonant legs 120, 122 of the SCC 100 should match the switching frequency $F_{SW}$, with a small adjustment to account for the dead time intervals.

The controller 150 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 150 may also include memory, e.g., non-volatile memory such as flash, that includes instructions or data for use by the processor circuitry, and one or more timers, e.g., for providing the switch intervals according to the switching frequency and dead time intervals.

Voltage and Current Waveforms within Switched-Capacitor Converters

Figures 2, 3:
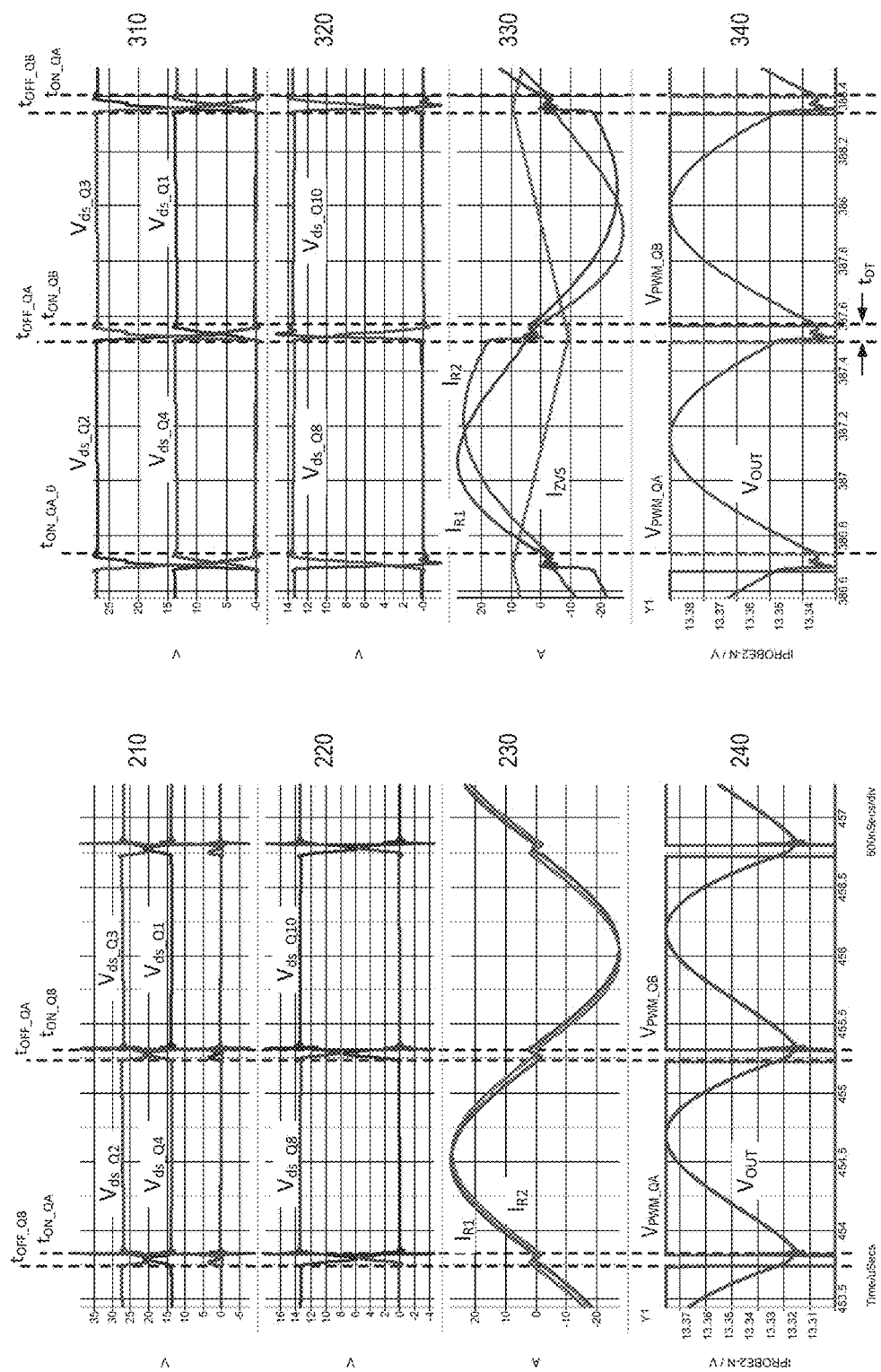
FIG. 2 illustrates voltage and current waveforms within an SCC that uses zero-current switching (ZCS) but does not have a compensation inductor.
FIG. 3 illustrates voltage and current waveforms within an SCC that has a compensation inductor, such as the SCC of FIG. 1.
Figure 4:
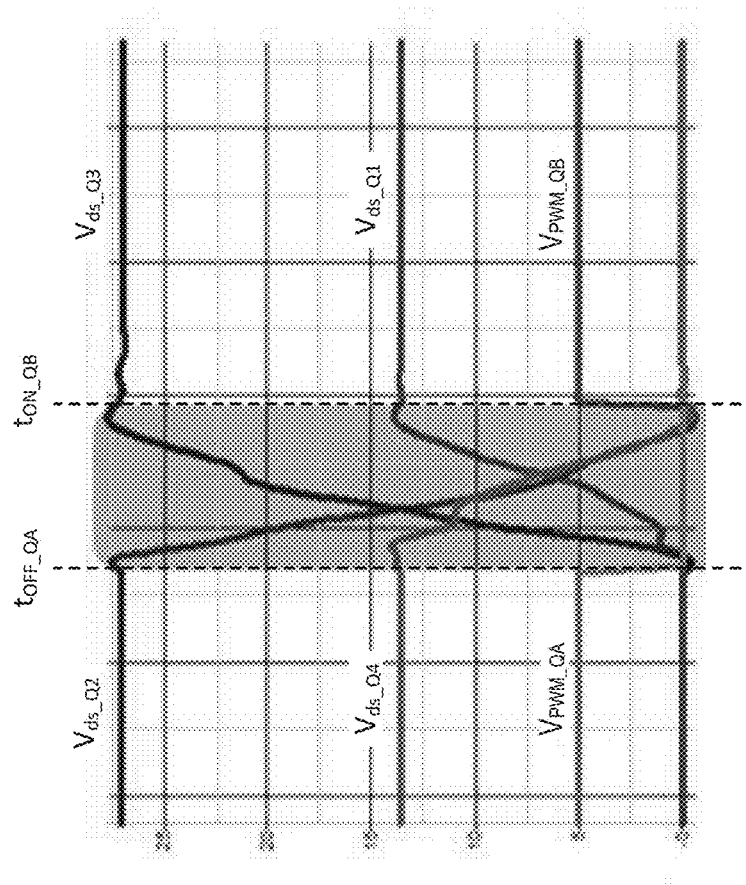
FIG. 4 illustrates waveforms corresponding to switch voltages in the SCC of FIG. 1 and shows the zero-voltage switching (ZVS) achieved therein.

FIGS. 2-4 illustrate voltage and current waveforms within SCCs that implement soft switching of the switches within switch stages and rectifiers, such as within the SCC 100 of FIG. 1.

The voltage and current waveforms of FIG. 2 correspond to an SCC that uses zero-current switching (ZCS), but that does not include a compensation inductor, such as $L_{ZVS}$ within FIG. 1, providing zero-voltage switching (ZVS). For ease of illustration, such a ZCS SCC is not shown but would resemble the SCC 100 of FIG. 1, with the noteworthy exception that the compensation inductor $L_{ZVS}$ is deleted. Additionally, the resonant inductances $L_{R1}$, $L_{R2}$ within a ZCS SCC are typically inductor components, rather than the preferred parasitic inductances described previously for the SCC 100.

The ZCS SCC corresponding to FIG. 2 has a switching frequency of 335 kHz. (The corresponding switching half-period is 1490 ns, which is reduced by a dead time of 80 ns yielding an active/conducting half-period of 1410 ns. When the switching frequency is thus derated by the dead time, the effective active switching frequency is 353 kHz.) The ZCS SCC has first and second resonant legs, which include resonant inductors $L_{R1}$, $L_{R2}$ with inductances of 70 nH and resonant capacitors inductors $C_{R1}$, $C_{R2}$ with capacitances of 2.82 ρF. The resonant inductances will be further increased by the parasitic inductances of power loops that include the first and second resonant legs. For example, a first power loop that includes, in part, the first resonant leg may have a parasitic inductance $L_{PARA1}$=7 nH. The inductor $L_{R1}$, parasitic inductance $L_{PARA1}$, and capacitor $C_{R1}$ form a resonant tank having a resonant frequency given by:

$$f\_res = \frac{1}{2\pi\sqrt{(L_{R1} + L_{PARA1}) * C_{R1}}}. \quad (1)$$

The resultant resonant frequency f_res=342 kHz is very close to the desired frequency of 353 kHz. The currents $I_{R1}$, $I_{R2}$ within the first and second resonant legs take on sinusoidal shapes, as shown in the current waveforms 230. Because the resonant frequency (e.g., approximately 342 kHz) of each resonant tank is well-matched to the effective active switching frequency (353 kHz), the switches are turned off when nearly zero current is flowing through them, as shown at times $t_{OFF\_QB}$, $t_{OFF\_QA}$ within FIG. 2.

FIG. 2 further illustrates voltage waveforms 240 corresponding to control signals $V_{PWM\_QA}$, $V_{PWM\_QB}$ for the switches of the ZCS SCC, and an output voltage $V_{OUT}$ of the ZCS SOC. Waveforms 220 corresponding to the drain-to-source voltages $V_{ds\_Q8}$, $V_{ds\_Q10}$ across the rectifier switches are shown, as are waveforms 210 corresponding to the drain-to-source voltages $V_{ds\_Q1}$, ... $V_{ds\_Q4}$ across switches within the switch stages. Note that the drain-to-source voltages $V_{ds\_Q1}$, ... $V_{ds\_Q4}$ across switches within the switch stages do not drop to zero before these switches are turned on, e.g., at times $t_{ON\_QA}$, $t_{ON\_QB}$. While the SCC corresponding to the waveforms of FIG. 2 achieves ZCS, it does not achieve ZVS.

In order to achieve ZCS, or near ZCS, the resonant frequencies f_res corresponding to power loops (conduction paths) that include each of the resonant legs must be closely matched to each other and to the desired switching frequency. This, in turn, means that the inductance-capacitance product, as provided in equation (1), must be fairly precise. To achieve this, high-precision inductors and capacitors are typically required. In addition to having low tolerances, e.g., ±5%, the resonant inductors and capacitors must be stable over temperature, and the capacitors must not have a high dependency on any DC bias voltage across them. Such high-precision, temperature-stable, bias-independent components are more expensive and larger than standard components. Hence, a ZCS SCC corresponding to the waveforms of FIG. 2 is relatively expensive, physically large, and does not achieve the switching efficiencies provided by ZVS.

FIG. 3 illustrates voltage and current waveforms similar to those of FIG. 2, but corresponding to the ZVS SCC 100 of FIG. 1. The illustrated waveforms 340 for the signals $V_{PWM\_QA}$, $V_{PWM\_QB}$ that control the switches, and the output voltage $V_{OUT}$ of the SCC 100 are similar to the waveforms 240 of FIG. 2 except, notably, that the switching frequency of the SCC 100 is 600 kHz rather than 335 kHz. However, the FIG. 3 waveforms 330 corresponding to the resonant currents $I_{R1}$, $I_{R2}$, and the FIG. 3 waveforms 310 corresponding to drain-to-source voltages for the switches $Q_1$, $Q_2$, $Q_3$, $Q_4$ differ substantially from those of FIG. 2.

FIG. 4 illustrates waveforms 410 corresponding to drain-to-source voltages $V_{ds\_Q1}$, $V_{ds\_Q2}$, $V_{ds\_Q3}$, $V_{ds\_Q4}$ across the switches $Q_1$, $Q_2$, $Q_3$, $Q_4$ of the switch stages 110, 112. These waveforms 410 represent an expanded view of similar waveforms 310 within FIG. 3 in the vicinity when the controller 150 turns off the switches within group A and turns on the switches within group B. So as to provide timing context for the drain-to-source voltages, waveforms for the switch control signals $V_{PWM\_QA}$, $V_{PWM\_QB}$ are also shown. For the illustrated time interval prior to time $t_{OFF\_Q4}$, the switches $Q_1$, $Q_3$ of group A are turned on, as indicated by the active high pulse on the group A control signal $V_{PWM\_QA}$, whereas the switches $Q_2$, $Q_4$ of group B are turned off. Because the group A switches $Q_1$, $Q_3$ are conducting (closed), the drain-to-source voltages $V_{ds\_Q3}$ across them is zero during this time interval. The drain-to-source voltages $V_{ds\_Q2}$, $V_{ds\_Q4}$ for the group B switches $Q_2$, $Q_4$, which are not conducting (i.e., open), will float, respectively, to twice the output voltage $V_{OUT}$ and to the output voltage $V_{OUT}$ during this time interval. For a voltage of 54V provided by the input power supply $V_{IN\_DC}$, the resultant voltage $V_{ds\_Q2}$ across the second switch $Q_2$ is 27V, whereas the resultant voltage $V_{ds\_Q4}$ across the fourth switch $Q_4$ is 13.5V.

At time $t_{OFF\_Q4}$, the control signal $V_{PWM\_QA}$ for group A transitions to a low value so as to turn off the group A switches $Q_1$, $Q_3$. This means that none of the switches are conducting, i.e., they are all open until time $t_{ON\_QB}$. This interval when no switches are conducting is often termed dead time. Referring to the second switch $Q_2$ of the SCC 100, the compensation inductor $L_{ZVS}$ provides a conduction path from the drain of this switch, i.e., from the first switching node $V_1$ within the SCC 100 of FIG. 1. During the dead-time, charge stored on the capacitance $C_{OSS}$ of the second switch $Q_2$ will be discharged by current $I_{ZVS}$ conducted through the compensation inductor $L_{ZVS}$. Provided adequate current flow $I_{R1}$ (charge transfer) from the drain of the second switch $Q_2$ during the dead time, the voltage at this drain (i.e., node $V_1$) will be reduced from $3*V_{OUT}$ to $1*V_{OUT}$, which matches the voltage at the source (i.e., node $V_2$) of the second switch $Q_2$ at the end of the dead time. Hence, the drain-to-source voltage $V_{ds\_Q2}$ across the second switch $Q_2$ is reduced to zero before time $t_{ON\_QB}$. With zero voltage across the second switch $Q_2$ when it is turned on at time $t_{ON\_QB}$, ZVS (soft switching) is achieved.

The drain of the fourth switch $Q_4$ is similarly discharged during the dead time. More particularly, the compensation inductor $L_{ZVS}$ enables current $I_{R2}$ to flow through the second resonant leg 122, thereby discharging stored charge on the capacitance $C_{OSS}$ of the fourth switch $Q_4$. Provided adequate current flow $I_{R2}$ (charge transfer) from the drain of the fourth switch $Q_4$ during the dead time, the voltage at this drain (i.e., at node $V_3$) will be reduced from $2*V_{OUT}$ to $1*V_{OUT}$, which matches the voltage at the source of the fourth switch $Q_4$ (i.e., at node $V_{OUT\_DC}$) at the end of the dead time. Hence, the drain-to-source voltage $V_{ds\_Q4}$ across the fourth switch $Q_4$ is reduced to zero before time $t_{ON\_QB}$, thereby achieving zero-voltage soft switching (ZVS) for the turn on of the fourth switch $Q_4$ at time $t_{ON\_QB}$.

During the described dead time, the currents $I_{R1}$, $I_{R2}$ flowing through the resonant legs 120, 122 are summed at their connecting node $V_4$ resulting in a current $I_{ZVS}$ flowing in the compensation inductor $L_{ZVS}$. (There is no current flow through the first half-bridge rectifier branch 140, as its switches $Q_7$, $Q_8$ are turned off.) During this dead time, energy is transferred out of the capacitances $C_{OSS}$ of the second and fourth switches $Q_2$, $Q_4$ and stored in the compensation inductor $L_{ZVS}$. The inductor current $I_{ZVS}$ is illustrated in the waveforms 330 of FIG. 3, where a peak current magnitude of 10A flows during each of the illustrated dead times.

A second dead time occurs between the point in time when the switches within group B are turned off and the point in time when the switches of group A are turned on, i.e., between the time $t_{OFF\_QB}$ and the time $t_{ON\_Q4}$ in FIG. 3. This second dead time interval is not illustrated in an expanded view. The circuit operation during this second dead time complements the operation described above. During the second dead time, currents $I_{R1}$, $I_{R2}$ through the resonant legs flow in the opposite direction to that described previously, and serve to charge the source of the first and third switches $Q_1$, $Q_3$. Energy is transferred from the compensation inductor $L_{ZVS}$ to the capacitances $C_{OSS}$ of these switches $Q_1$, $Q_3$. The source voltages, as provided at the nodes $V_1$, $V_3$, is increased during the second dead time until these voltages match, respectively, the drain voltages for these switches $Q_1$, $Q_3$. In other words, the drain-to-source voltages $V_{ds\_Q1}$, $V_{ds\_Q3}$ are reduced to zero during the second dead time, thereby achieving zero-voltage soft switching (ZVS) when the group A switches $Q_1$, $Q_3$ are turned on.

The compensation inductor $L_{ZVS}$ within the SCC 100 must be capable of handling the peak current required to achieve the above-described ZVS, i.e., such that adequate charge can be transferred during the dead times. This peak current is determined by the sum of all charges $Q_{OSS}$ that must be drained from (or provided to) the switch capacitances $C_{OSS}$ for each switch group. The charge accumulation on a given switch capacitor $C_{OSS}$ depends upon its capacitance and upon the resonant frequency mismatch within the SCC 100. A mismatched resonant frequency leads to current flow through a switch when that switch is turned off, i.e., ZCS is not achieved. At the instant when the switch is disabled, the residual current flow causes charge accumulation on the switch capacitance $C_{OSS}$.

The current flowing through each of the resonant legs must be capable of discharging (charging) the charge $Q_{OSS}$ of its associated switch within the prescribed dead time $t_{DT}$. The compensation inductor $L_{ZVS}$ must support the current flows through all of the resonant legs. In the specific example based upon the SCC 100, the $C_{OSS}$ of the MOSFET switches, the resonant frequency mismatch leading to the non-zero resonant currents $I_{R1}$, $I_{R2}$ when they are turned off, and the dead time $t_{DT}$ of 60 ns lead to the peak current magnitude of 10A which is illustrated in the current waveforms 330 of FIG. 3. An SCC having better resonant frequency matching will require lower peak current magnitudes, as will SCCs that use longer dead times. The switch capacitance $C_{OSS}$ or similar also has a significant effect on charge accumulation and the associated peak current requirement. The switch capacitance is largely a function of the type of switch, and may be significantly different for switches other than the MOSFETs described for the SCC 100 of FIG. 1.

FIG. 3 further illustrates waveforms 330 corresponding to resonant currents $I_{R1}$, $I_{R2}$ flowing in the first and second resonant legs 120, 122. As shown, the first resonant current provides near-ideal ZCS at the end of its positive half-cycle, i.e., when the first switch Q is turned off at time $t_{OFF\_Q4}$ there is nearly zero current flowing through it. However, there is a significant nonzero current $I_{R1}$ flowing through the first resonant leg and the second switch $Q_2$ when the second switch $Q_2$ is turned off at time $t_{OFF\_QB}$. This is caused by a mismatch in the resonant frequencies for different power loops within the SCC 100. A similar mismatch occurs for the second resonant leg 112, leading to nonzero current $I_{R2}$ at time $t_{OFF\_Q4}$ when the third switch $Q_3$ is turned off.

The mismatches in the resonant frequencies for the positive vs. negative half-cycles are not a significant problem in the current waveforms 230 illustrated in FIG. 2. As previously described, the ZCS SCC includes actual inductor components $L_{R1}$, $L_{R2}$ within the resonant legs 120, 122. The parasitic inductances within the power loops are relatively insignificant compared to the inductance of such inductor components $L_{R1}$, $L_{R2}$. For example, the inductor components may have inductances of 70 nH, as described previously, whereas the traces and other elements within a given power loop have inductances of, typically, 1 nH to 7 nH. Variation in the parasitic inductances for the different power loops has a relatively insignificant effect on the overall inductance, which is dominated by the inductor components, and on the resultant resonant frequencies.

The situation is quite different for the SCC 100 of FIG. 1 if there are no inductor components and the resonant inductances $L_{R1}$, $L_{R2}$ are provided solely by parasitic inductances. Variation in the length of traces and/or number of elements within the power loops (conduction paths) may yield significantly different parasitic inductances, resulting in the resonant frequency mismatches evident in the current waveforms 330 of FIG. 3. This will be further explained using the power loops (conduction paths) illustrated in FIGS. 5A-5D. For ease of illustration, some of the demarcations shown in the SCC 100 of FIG. 1 have been deleted in FIGS. 5A-5D, but the underlying circuit connections are the same as in FIG. 1. Also for ease of illustration, the controller 150 is not shown in FIGS. 5A-5D.

Figure 5B:
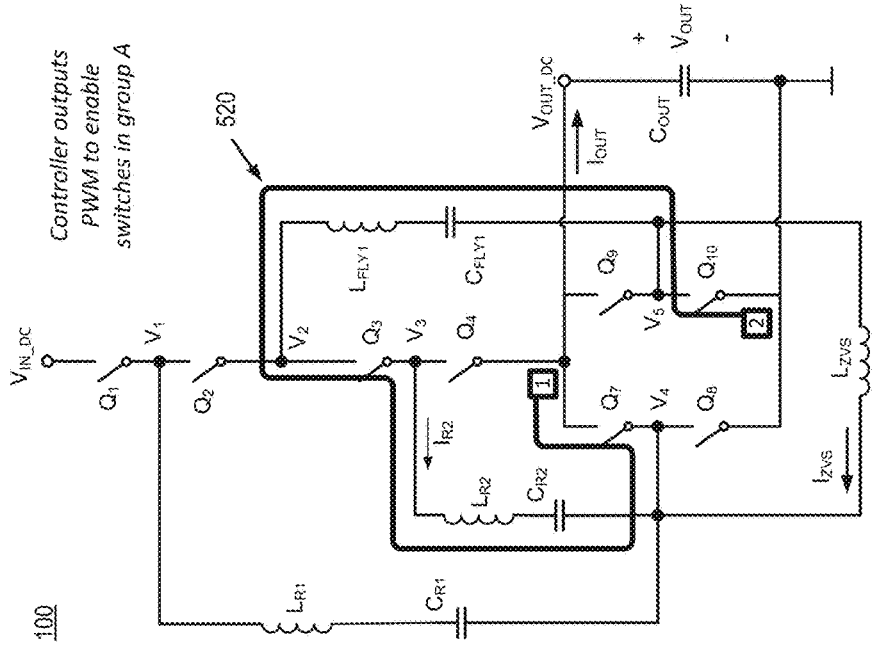
Figure 5A:
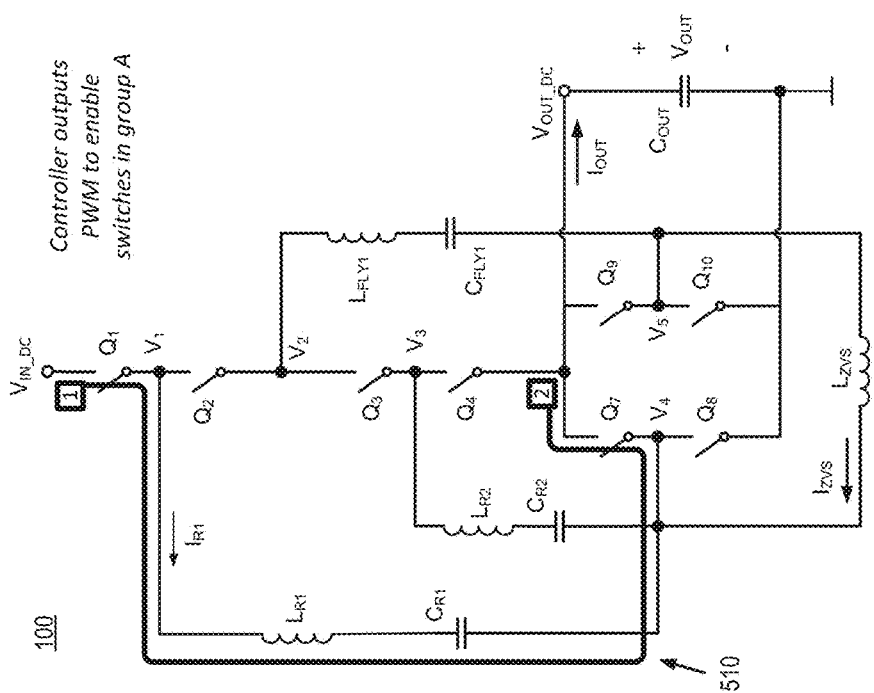

FIGS. 5A and 5B illustrate power loops 510, 520 when the switches Q1, Q3, Q7, Q10 of group A are turned on (conducting), whereas FIGS. 5C and 5D illustrate power loops 530, 540 when the switches Q2, Q4, Q8, Q9 of group B are turned on (conducting). The resonant current $I_{R1}$ of the first resonant leg will be considered first using FIGS. 5A and 5C.

A reactance of the illustrated conduction path 510 from node 1 ($V_{IN\_DC}$) to node 2 ($V_{OUT\_DC}$) determines a resonant frequency for the first resonant current $I_{R1}$ when this current is in a positive half cycle. In designing the SCC 100, a parasitic inductance of this path may be characterized via circuit simulation or measurement. If the SCC 100 is implemented on a printed circuit board (PCB), then this inductance includes the parasitic inductances of the first switch Q$_1$, the first resonant capacitor $C_{R1}$, a half-bridge switch Q$_7$, and the PCB traces that connect these elements. (An integrated circuit implementation may instead characterize the parasitic inductance of traces on a die.) Once this inductance is characterized, a capacitance for the first resonant capacitor may be chosen based upon a given switching frequency and dead time. For example, if the parasitic inductance of this path 510 is 1 nH and the controller uses a switching frequency of 600 kHz (switching half-period of 833 ns) with a dead time of 60 ns (active switching half period of 773 ns), then the first resonant capacitor $C_{R1}$ would be designed with a capacitance of 60 µF. With such a configuration, the first resonant current $I_{R1}$ would take on a half-sinusoidal shape that would fall to zero 770 ns after its initial rise. (See equation 1.) This is shown in the waveform 330 for the first resonant current $I_{R1}$ within FIG. 3, which begins rising at time $t_{ON\_QA\_0}$, when the first switch Q$_1$ is turned on, and falls to zero approximately 770 nsec later at time $t_{OFF\_QA}$, when this switch Q$_1$ is turned off.

After a dead time $t_{DT}$, the switches within group B are turned on at time $t_{ON\_Q3}$. This results in current conduction through the power loop 530 illustrated in FIG. 5C. A reactance of the illustrated conduction path 530 from node 1 ($V_{OUT\_DC}$) to node 2 (ground) determines a resonant frequency for the first resonant current $I_{R1}$ when this current is in a negative half cycle. If the SCC 100 is implemented on a printed circuit board (PCB), then this inductance includes the parasitic inductances of the second switch Q$_2$, the first resonant capacitor $C_{R1}$, half-bridge switches Q$_8$ and Q$_9$, the first flying capacitor $C_{FLY1}$, and the PCB traces that connect these elements. This inductance will be larger than the 1 nH inductance of the power loop 510, due to the additional switch, additional capacitor, and the additional traces. The first flying capacitor $C_{FLY1}$ also affects the resonant capacitance for the power loop 530. For $C_{FLY1}$=40 µF and $C_{R1}$=60 µF, the overall resonant capacitance of the power loop 530 is 24 µF, which is considerably smaller than the resonant capacitance of the power loop 510. The different reactance of the power loop 530 leads to a different resonant frequency for the negative half-cycle of the first resonant current $I_{R1}$. This is shown in the current waveforms 330 of FIG. 3, wherein the second switch Q$_2$ is turned off while current is still flowing through it at time $t_{OFF\_QB}$, i.e., zero current switching (ZCS) is not achieved for the negative half-cycle of the first resonant current $I_{R1}$ that flows through the second switch Q$_2$ and the switches Q$_8$, Q$_9$ of the rectifier.

Conduction paths for the second resonant current $I_{R2}$ are shown in the power loop 520 of FIG. 5B and the power loop 540 of FIG. 5D. The relationship between the reactances of the power loops 520, 540 and the resonant frequencies for the positive and negative half-cycles of the second resonant current $I_{R2}$ will not be described in detail, as such descriptions are similar to those provided above for the first resonant current $I_{R1}$. As shown in the waveforms 330 of FIG. 3, the positive half-cycle for the second resonant current $I_{R2}$ does not achieve ZCS due to a mismatch in the resonant frequency of the power loop 520 and the switching frequency. However, the negative half-cycle for the second resonant current $I_{R2}$ does achieve ZCS as the resonant frequency of the power loop 540 closely matches the switching frequency.

Alternative Switched-Capacitor Converter Circuit Topologies

The SCC 100 of FIG. 1 shows a compensation inductor $L_{ZVS}$ coupling two half-bridge rectifier branches within a 4:1 SCC. However, other circuit topologies may connect compensation inductors in other ways, and still other circuits may provide other conversion ratios.

The controller 150 within FIG. 1 is presumed to generate symmetric control signals $V_{PWM\_QA}$, $V_{PWM\_QB}$, i.e., PWM waveforms that have 50% duty cycle except for the dead time. If non-symmetric PWM signals are generated, e.g., having a duty cycle other than 50%, then the energy stored and released from the compensation inductor $L_{ZVS}$ may not be perfectly balanced and the compensation inductor $L_{ZVS}$ may saturate. This issue may be addressed by placing a DC blocking capacitor in series with the compensation inductor $L_{ZVS}$. (For ease of illustration, such a circuit is not shown.)

Figure 9:
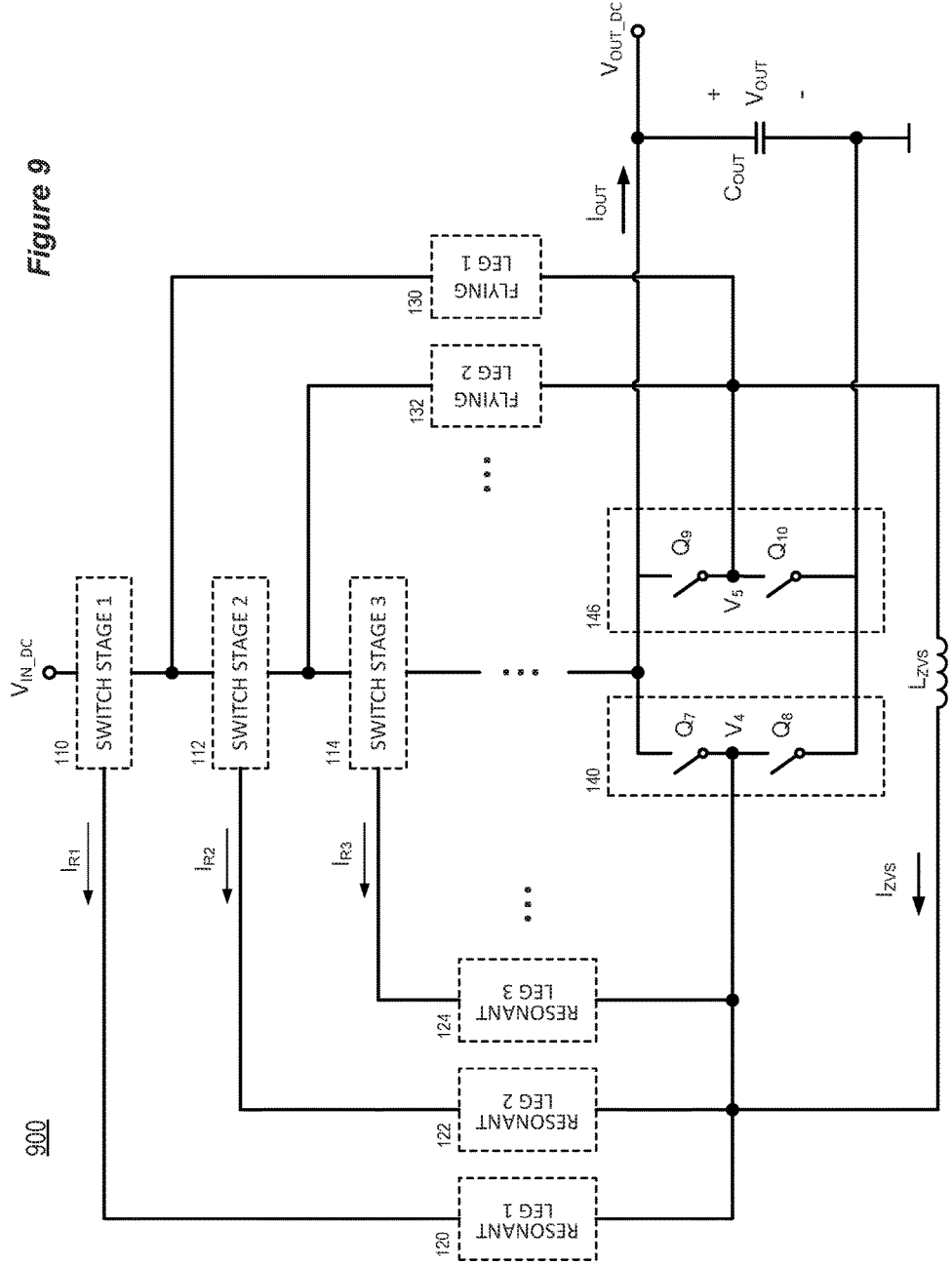
FIG. 9 illustrates a schematic diagram of a switched-capacitor converter (SCC) similar to that of FIG. 1, but including additional switch stages.

The SCC 100 of FIG. 1 uses two switch stages 110, 112 to down-convert the input voltage by a factor of four. This SCC 100 may be readily extrapolated to provide other conversion ratios. For example, the second conversion stage 112, the second resonant leg 122, and the first flying leg 130 may be deleted to yield an SCC having a 2:1 conversion ratio. Conversely and as shown in the SCC 900 illustrated in FIG. 9, a third switch stage 114 may be interposed between the second switch stage 112 and the rectifier, and have an associated third resonant leg 124 and an associated second flying leg 132. These components would be connected in a manner similar to the second switch stage 112, the second resonant leg 122, and the first flying leg 130 of the SCC 100. The resultant SCC would have a down-conversion of 6:1. This technique could be repeated to achieve down-conversions of 8:1 and beyond. For ease of illustration, circuits having these alternative down-conversion ratios are not explicitly illustrated.

Figure 6:
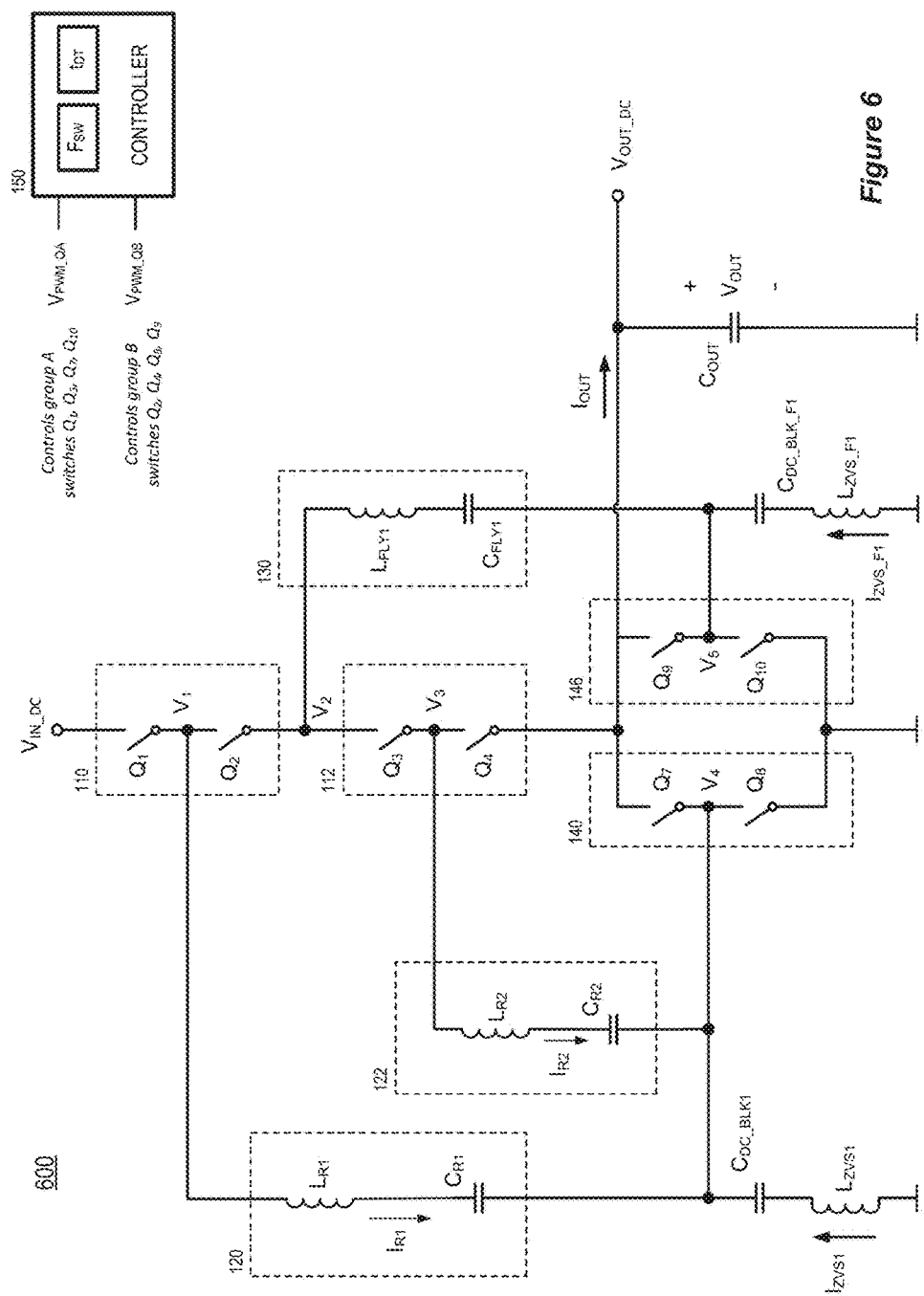
FIG. 6 illustrates an alternative SCC which is similar to the SCC of FIG. 1, but wherein compensation inductors are coupled between the first half-bridge rectifier and ground, and between the second half-bridge rectifier and ground.

FIG. 6 illustrates an alternative SCC circuit 600 in which a first compensation inductor $L_{ZVS1}$ is connected between the first half-bridge rectifier branch 140, at a half-bridge switch node $V_4$, and ground. A first DC blocking capacitor $C_{DC\_BLK1}$ is placed in series with the first compensation inductor $L_{ZVS1}$, so that the DC voltage at the half-bridge switch node $V_4$ is not undesirably impacted by the first compensation inductor $L_{ZVS1}$. A flying compensation inductor $L_{ZVS\_F1}$ and a flying DC blocking capacitor $C_{DC\_BLK\_F1}$ connect the first flying leg 130 to ground and enable charging/discharging of capacitances for the second and third switches $Q_2$, $Q_3$.

Figure 7:
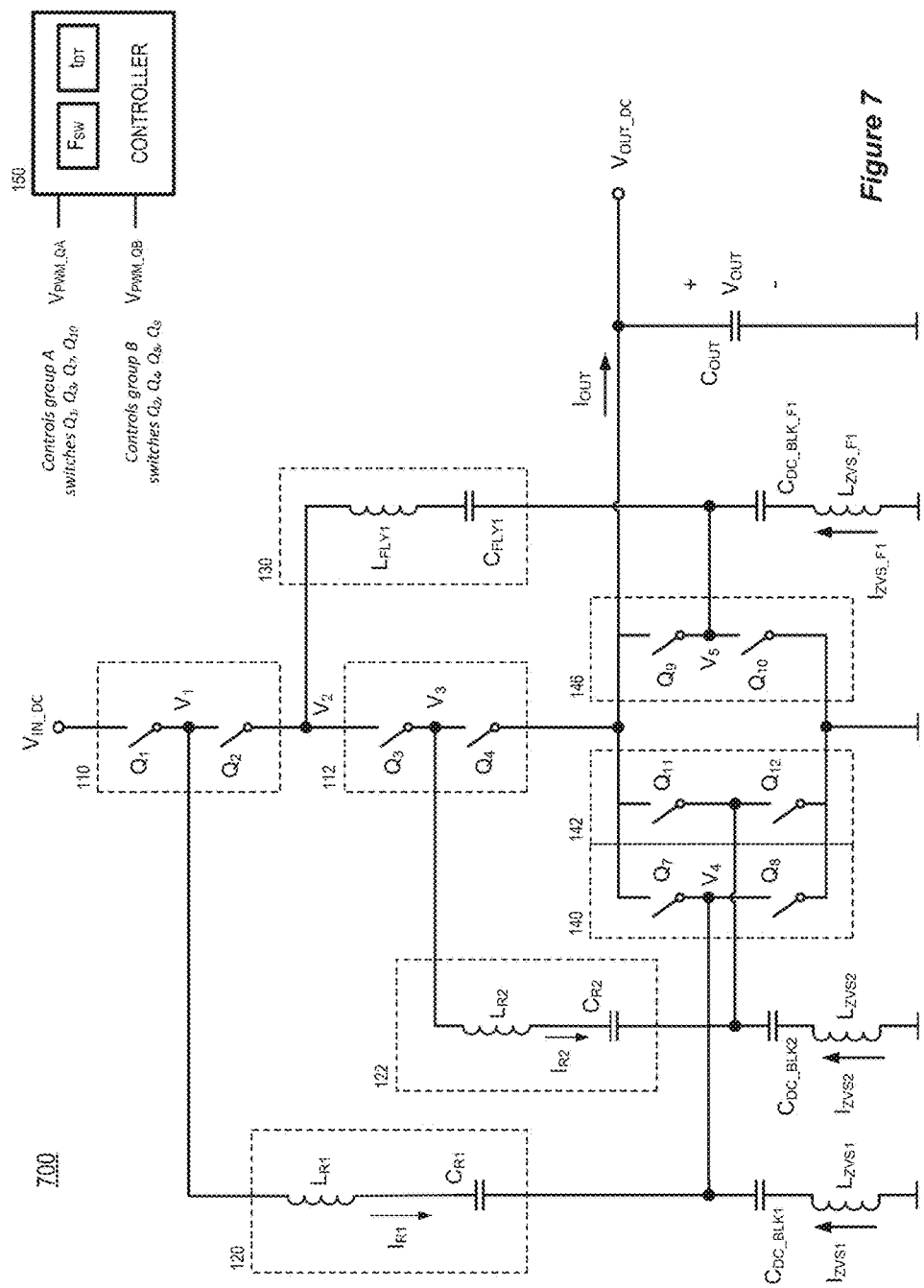
FIG. 7 illustrates an alternative SCC which is similar to the SCC of FIG. 6, but wherein a third half-bridge rectifier branch is included and another compensation inductor couples this third half-bridge rectifier branch to ground.

FIG. 7 illustrates another alternative SCC circuit 700 in which a third half-bridge rectifier branch 142 is provided to support the second resonant leg 122 and its associated second resonant current $I_{R2}$. By splitting the resonant currents $I_{R1}$, $I_{R2}$ between two half-bridge rectifier branches 140, 142, the half-bridge rectifier switches are not required to support current levels as high as is required when one half-bridge rectifier branch 140 is used to support both resonant legs 140, 142, as in the SCC 100 of FIG. 1 and the SCC 600 of FIG. 6. The alternative SCC 700 also includes a second compensation inductor $L_{ZVS2}$ and a second DC blocking capacitor $C_{DC\_BLCK2}$, which are coupled to the second resonant leg 122 and serve to discharge and charge, respectively, capacitances of the third and fourth switches $Q_3$, $Q_4$.

The SCC 600 of FIG. 6 includes two half-bridge rectifier branches 140, 146, which provide full-wave rectification for the voltage $V_{OUT}$ provided at the output $V_{OUT\_DC}$. In an alternative SCC topology, the second half-bridge rectifier branch 146 may be deleted, leading to half-wave rectification for the voltage $V_{OUT}$ provided at the output $V_{OUT\_DC}$.

Figure 8:
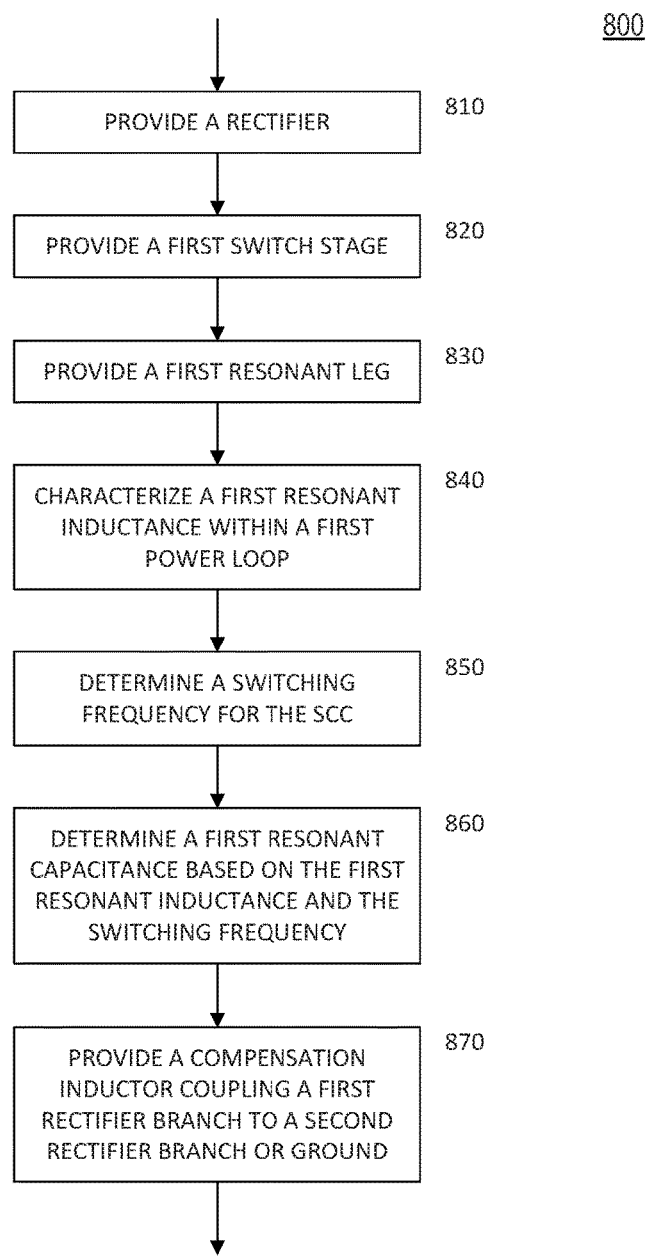
FIG. 8 illustrates a method for providing an SCC that includes a compensation inductor configured to couple a first half-bridge rectifier branch to a second half-bridge rectifier branch or a ground.

Method for Providing a Switched-Capacitor Converter that uses a Compensation Inductor FIG. 8 illustrates a method 800 for providing a switched-capacitor converter (SCC) that converts power from a power supply at an input into power at an output. This method 800 may be used to design an SCC such as the SCC 100 of FIG. 1. The method provides 810 a rectifier at the output of the SCC, provides 820 a first switch stage, and provides 830 a first resonant leg. The first switch stage includes first and second switches connected in series at a first connection node, wherein the first switch stage is interposed between the input and the rectifier. The first resonant leg comprises a first resonant capacitor coupled between the first connection node and a first rectifier branch of the rectifier.

A first power loop of the SCC connects the input to the output and includes the first switch, the first resonant leg, a rectifier switch within the first rectifier branch and traces connecting these elements. The method proceeds by characterizing 840 a first resonant inductance of this first power loop. A switching frequency is determined 850 for the SCC. A first capacitance for the first resonant capacitor is then determined 860 based upon the first resonant inductance and the switching frequency, e.g., using equation (1). Finally, a compensation inductor is provided 870 and couples the first rectifier branch to either a second branch of the rectifier, or a ground.

The characterization of the first resonant inductance is typically performed by simulating the inductances of elements and traces on an SCC that is being designed, but may also be accomplished by measuring inductances on an SCC circuit.

The capacitance of a capacitor component typically varies according to the DC voltage applied across the capacitor. For example, a standard capacitor with a rated value of 10 μF for no DC bias may have a nominal capacitance of 8.9 μF when a 13.5 V DC bias is applied across it, a capacitance of 5.5 μF when a 27 V DC bias is applied across it, and a capacitance of 3.5 μF when a 40.5 V DC bias is applied across it. Within an SCC such as the SCC 100 of FIG. 1, the first resonant capacitor $C_{R1}$ will typically have a fairly significant bias voltage of 40.5 V ($3*V_{OUT}$) across it. Such a bias voltage should be taken into account when choosing resonant capacitors for an SCC.

Presume that a first capacitance of 20 μF is determined for the first resonant capacitor, and that a DC bias of 40.5 V is expected across this capacitor. According to the above-described dependence of capacitance on DC bias, a 10 μF would only yield 3.5 μF at a 40.5 V DC bias. To achieve the desired capacitance of 20 μF, 6 of the capacitors rated at 10 μF would be placed in parallel to form the desired first resonant capacitor, thereby resulting in a capacitance of 21 μF at a DC bias of 40.5 V.

The method 800 may be extended to characterize a second resonant inductance within a second power loop, or further resonant inductances corresponding to further power loops. Such characterizations may use techniques similar to those described in relation to FIGS. 5B-5D. Second and further capacitances may then be determined based upon the second and further resonant inductances.

The resonant frequencies of power loops (conduction paths) within an SCC may not be perfectly matched. The method may further be extended to characterize mismatches in such resonant frequencies, and to determine an inductance and power rating for the compensation inductor based on these mismatches.

The method 800 may also be extended to provide additional switch stages, resonant legs, and flying legs, as shown in the SCC 100 of FIG. 1.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:
1. A switched-capacitor converter comprising:
an input for coupling to an input power supply;
an output for providing power to a load;
a rectifier at the output;
a first switch stage comprising a first switch and a second switch connected in series at a first connection node and interposed between the input and the rectifier;

a first resonant leg comprising a first resonant capacitor that couples the first connection node to a first rectifier branch of the rectifier;

a controller operable to alternate switching of the first switch and second switch, so as to transfer energy from the input to the output, and wherein the switching of the first switch and second switch is performed at a switch frequency chosen to approximate zero current switching conditions for each of the first switch and the second switch; and a first compensation inductor that couples the first rectifier branch to a second rectifier branch of the rectifier or to a ground.

2. The switched-capacitor converter of claim 1, wherein the first resonant leg has a first resonant inductance, and wherein a capacitance of the first resonant capacitor is determined such that the switch frequency is a resonant frequency of the first resonant capacitor and the first resonant inductance.

3. The switched-capacitor converter of claim 2, wherein the first resonant inductance is provided by parasitic inductances within a first power loop connecting the input to the output, the first power loop comprising elements comprised of the first switch, the first resonant leg, and a rectifier switch within the first rectifier branch, and traces connecting these elements.

4. The switched-capacitor converter of claim 3, wherein the first resonant inductance does not include an inductor component.

5. The switched-capacitor converter of claim 1, further comprising a direct-current (DC) blocking capacitor connected in series with the first compensation inductor.

6. The switched-capacitor converter of claim 1, wherein the first switch stage is directly coupled to the first rectifier branch.

7. The switched-capacitor converter of claim 1, further comprising:
a second switch stage comprising a third switch and a fourth switch connected in series at a second connection node and interposed between the first switch stage and the rectifier;
a second resonant leg comprising a second resonant capacitor that couples the second connection node to the rectifier; and
a first flying leg comprising a first flying capacitor that couples a first inter-stage node connecting the first and second switch stages to the second rectifier branch or to the ground,
wherein the controller is further operable to switch the third switch in a same manner as the first switch, and to switch the fourth switch in a same manner as the second switch.

8. The switched-capacitor converter of claim 7, wherein the first flying leg further comprises a first flying inductance in series with the first flying capacitor.

9. The switched-capacitor converter of claim 8, wherein the first flying inductance is provided by parasitic inductances of traces connecting the first flying capacitor to the first inter-stage node and to the second rectifier branch or to the ground.

10. The switched-capacitor converter of claim 7, wherein the second resonant leg and the first resonant leg are coupled together at the first rectifier branch.

11. The switched-capacitor converter of claim 10, further comprising:
a direct-current (DC) blocking capacitor connected in series with the first compensation inductor, wherein the serially-connected first compensation inductor and DC blocking capacitor couple the first and second resonant legs to the ground.

12. The switched-capacitor converter of claim 7, further comprising:
a first direct-current (DC) blocking capacitor connected in series with the first compensation inductor, wherein the serially-connected first compensation inductor and first DC blocking capacitor are coupled between the first resonant leg and the ground;
a second compensation inductor connected in series with a second DC blocking capacitor, wherein the serially-connected second compensation inductor and second DC blocking capacitor are coupled between the second resonant leg and the ground, and
wherein the rectifier comprises a third rectifier branch and the second resonant leg is coupled to the third rectifier branch.

13. The switched-capacitor converter of claim 7, further comprising one or more additional capacitor-switch stages, each of which includes:
an additional switch stage comprising an additional high-side switch and an additional low-side switch connected in series at an additional connection node and interposed between the second switch stage and the rectifier;
an additional resonant leg comprising an additional resonant capacitor that couples the additional connection node to the rectifier; and
an additional flying leg comprising an additional flying capacitor that couples an inter-stage node to the second rectifier branch or to the ground, the inter-stage node connecting the additional switch stage to another switch stage,
wherein the controller is further operable to switch the additional high-side switch in a same manner as the first switch, and to switch the additional low-side switch in a same manner as the second switch.

14. The switched-capacitor converter of claim 1, wherein an inductance and a power rating of the first compensation inductor are based upon a peak current in the first compensation inductor and a dead-time interval during which no switches within the first switch stage are conducting.

15. The switched-capacitor converter of claim 14, wherein the peak current is based upon a mismatch in resonant frequencies for different power loops of the switched-capacitor converter.

16. A method for providing a switched-capacitor converter that converts power from a power supply at an input into power at an output, the method comprising:
providing a rectifier at the output;
providing a first switch stage having a first switch and a second switch connected in series at a first connection node, wherein the first switch stage is interposed between the input and the rectifier;
providing a first resonant leg that comprises a first resonant capacitor coupled between the first connection node and a first rectifier branch of the rectifier;
providing a first resonant inductance within a first power loop connecting the input to the output, the first power loop comprising elements comprised of the first switch, the first resonant leg, and a rectifier switch within the first rectifier branch, and traces connecting these elements;
determining a switching frequency for the switched-capacitor converter;

determining a first capacitance for the first resonant capacitor based upon the first resonant inductance and the switching frequency; and providing a compensation inductor that couples the first rectifier branch to either a second branch of the rectifier, or a ground.

17. The method of claim 16, wherein the traces connecting the elements of the first power loop comprise traces on a printed circuit board (PCB).

18. The method of claim 16, wherein the characterizing of the first resonant inductance comprises simulating inductances of the elements and traces of the first power loop.

19. The method of claim 16, wherein the characterizing of the first resonant inductance comprises measuring inductances of the elements and traces of the first power loop.

20. The method of claim 16, wherein determining the first capacitance is further based upon a derating of the first capacitance based upon a direct current (DC) voltage expected across the first resonant capacitor.

* * * * *